US006919400B2

(12) United States Patent
Nungesser et al.

(10) Patent No.: US 6,919,400 B2
(45) Date of Patent: *Jul. 19, 2005

(54) STABLE MIXTURES CONTAINING OPACIFYING PIGMENTS

(75) Inventors: Edwin Hugh Nungesser, Horsham, PA (US); John Michael Friel, Warminster, PA (US); Joseph David Tanzer, Fort Washington, PA (US); Jerry William Washel, Harleysville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 817 days.

This patent is subject to a terminal disclaimer.

(21) Appl. No.: 09/785,376

(22) Filed: Feb. 16, 2001

(65) Prior Publication Data

US 2002/0002934 A1 Jan. 10, 2002

Related U.S. Application Data

(60) Provisional application No. 60/183,655, filed on Feb. 18, 2000, provisional application No. 60/183,656, filed on Feb. 18, 2000, and provisional application No. 60/247,639, filed on Nov. 10, 2000.

(51) Int. Cl.$^7$ ................................................ C08K 3/22
(52) U.S. Cl. ...................... 524/497; 524/430; 524/432; 524/247; 524/284; 524/417; 524/445; 524/493
(58) Field of Search ................................ 524/497, 430, 524/432, 247, 284, 417, 445, 493

(56) References Cited

U.S. PATENT DOCUMENTS

| | | | |
|---|---|---|---|
| 4,170,485 A | 10/1979 | Blake et al. | 106/300 |
| 4,243,430 A | 1/1981 | Sperry et al. | 106/308 |
| 4,403,866 A | 9/1983 | Falcoff et al. | 366/138 |
| 4,436,845 A | 3/1984 | Kitano | 523/172 |
| 5,078,302 A | 1/1992 | Hellenberg | 222/144 |
| 5,129,551 A | 7/1992 | Gott | 222/135 |
| 5,527,853 A | 6/1996 | Landy et al. | 524/521 |
| 5,672,649 A | 9/1997 | Brock et al. | 524/507 |
| 5,823,670 A | 10/1998 | Rushing et al. | 366/152.1 |
| 5,842,641 A | 12/1998 | Mazzalveri | 239/104 |
| 5,922,398 A | 7/1999 | Hermes et al. | 427/137 |
| 5,989,331 A | 11/1999 | Bauer et al. | |
| 6,013,721 A | 1/2000 | Schall et al. | 524/555 |
| 6,221,145 B1 | 4/2001 | McClain | 106/443 |
| 6,308,499 B1 | 10/2001 | Takada et al. | 53/415 |
| 6,531,537 B2 * | 3/2003 | Friel et al. | 524/497 |
| 2002/0007867 A1 | 1/2002 | Takada et al. | 141/94 |

FOREIGN PATENT DOCUMENTS

| | | |
|---|---|---|
| CA | 935 255 | 10/1973 |
| CA | 935255 | 10/1973 |
| DE | 39 10 742 | 10/1990 |
| DE | 197 14 577 | 10/1998 |
| EP | 0 614 951 | 9/1994 |
| EP | 0 706 543 B1 | 4/1996 |
| EP | 1 094 096 | 4/2001 |
| EP | 1094 096 A1 | 4/2001 |
| IE | 940666 | 8/1994 |
| IT | PS98A000005 | 2/1998 |
| IT | PS98A000005 | 8/1999 |
| WO | WO 93/09187 | 5/1993 |
| WO | WO 94/25238 | 11/1994 |
| WO | WO 95/29960 | 11/1995 |
| WO | WO 98/05417 | 2/1998 |
| WO | WO 00/37568 | 6/2000 |
| WO | WO 00/44834 | 8/2000 |

OTHER PUBLICATIONS

U.S. Appl. No. 09/785,389, filed Feb. 16, 2001, Friel et al.
U.S. Appl. No. 09/785,637, filed Feb. 16, 2001, Friel et al.
U.S. Appl. No. 09/785,147, filed Feb. 16, 2001, Friel et al.
U.S. Appl. No. 09/785,152, filed Feb. 16, 2001, Friel et al.
Patton, "Latex Critical Pigment Volume Concentration (LCPVC)", *Paint Flow and Pigment Dispersion*, 1979, p. 193.
Forsius, "Paint Production by Component Mixing", *Faerg Lack Scand.*, 1997, 43(2), 5–6.
Dutheillet, "Integrated Solution to Build Batch Processing Plants for Blending & Formulation Industries", *Chemical Engineering World*, 1997, 32(5), 37–44.
Orcun, et al., "Scheduling of Batch Processes: An Industrial Application In Paint Industry", *Computers Chem. Enng.*, 1997, 21, S673–S678.
"Component Mixing—A New Approach to Customized Paint Production", *High Technology Finland*, 2000, 156–157.
Helander, "Benefits of delayed product differentiation", Reprinted from *PPCJ*, 1999.
Helander, "Impact of Form Postponement on Channel Members' Performance in Paint Business: A Theoretical Approach", *LTA*, 1999, p. 225–237.
"The Answer to your Request"—Dispensing Paint System, pp. 1–18.
"The Color Bank", pp. 1–12.
Dialogue Search Result.
"Custom Colours", Industrial and Materials Technologies, Jul. 1998 (2 pages).
Any Kind of Paint You Like, Innovation & Technology Transfer, Jul. 2000, p. 1–4.

* cited by examiner

Primary Examiner—Edward J. Cain

(57) ABSTRACT

A number of stable opacifying mixtures are disclosed which contain specific combinations and levels of titanium dioxide, thickeners, and dispersants. These stable mixtures may be employed in a method of making paints using prepaints or as a conventional component in a coating such as a paint, or in other end-uses where opacifying pigments are employed.

19 Claims, No Drawings

STABLE MIXTURES CONTAINING OPACIFYING PIGMENTS

CROSS REFERENCE TO RELATED APPLICATIONS

This application claims priority to U.S. Provisional Applications Ser. No. 60/183,655 filed Feb. 18, 2000, Ser. No. 60/183,656 filed Feb. 18, 2000, and Ser. No. 60/247,639 filed Nov. 10, 2000.

BACKGROUND OF THE INVENTION

1. Field of the Invention

This invention is related to stable mixtures containing opacifying pigments and more specifically, to stable mixtures containing select combinations and levels of titanium dioxide, a thickener, and a dispersant for use in making paint and other end products.

2. Description of Related Art

In co-pending U.S. provisional patent applications Ser. Nos. 60/183,655; 60/183,656; and 60/247,639; prepaints and a method of making paints from these prepaints is described. One of the prepaints is a mixture comprising at least one opacifying pigment, typically titanium dioxide. The other two prepaints may contain either an extender pigment or/and an emulsion polymeric binder. A key requirement for the prepaints is their compatibility with one another so that they may be mixed with each other in various ratios to make at least one paint line. Another key requirement is that the prepaints, whether comprising an opacifying pigment, an extender pigment, or an emulsion polymeric binder, be stable so that the prepaints may be prepared, shipped, and stored without failing, for example, failure by exhibiting non-homogeneity, syneresis, settling, gelling and/or viscosity changes.

With respect to prepaints containing an opacifying pigment, stability can be a serious problem. This is especially true when one considers that even the best commercially-available titanium dioxide slurries show some syneresis (>2% by volume by visual inspection) upon storage and must be stirred vigorously and for a considerable length of time before use.

Hence, there is a need for stable mixtures containing specific combinations and levels of titanium dioxide, thickeners, and dispersants that may be employed, inter alia, as prepaints in a method of making paints or as conventional components in other end-uses where opacifying pigments are employed, including coatings, impregnants, inks, graphic arts, papers, textiles, caulks, mastics, adhesives, sealants, building products and leather.

SUMMARY OF THE INVENTION

Various fluid opacifying mixtures based on titanium dioxide are provided. Some of the mixture are stable and no mixing is required, others are stable with occasional mixing required, and others are stable with constant mixing required.

As used herein for all the mixtures "lbs/100 gallons" is based on the weight of the dry material, unless otherwise noted.

The following mixtures are stable and require no mixing when formulated as described below.

Mixture is a fluid opacifying pigment mixture comprising:
(a) about 600 to about 1500 lbs/100 gallons of at least one universal-grade titanium dioxide;
(b) about 0.2 to about 20 lbs/100 gallons of at least one hydrophobically-modified ethylene oxide-urethane polymer (HEUR) thickener selected from the group consisting of:
  (i) a HEUR having a $C_4$–$C_{12}$ hydrophobe and a molecular weight of about 10,000 to about 200,000;
  (ii) a HEUR having a $C_6$–$C_{30}$ hydrophobe and a molecular weight of about 10,000 to about 200,000; and
  (iii) combinations thereof; and
(c) about 1.5 to about 16 lbs/100 gallons of at least one dispersant selected from the group consisting of a maleic acid/diisobutylene copolymer, a butylmethacrylate/methacrylic acid copolymer, and an acrylic acid—hydroxypropyl acrylate copolymer;

Mixture 2 is a fluid opacifying pigment mixture comprising:
(a) about 600 to about 1500 lbs/100 gallons of at least one interior-grade titanium dioxide;
(b) about 0.3 to about 5 lbs/100 gallons of at least one hydrophobically-modified, alkali-soluble or alkali-swellable emulsion (HASE) thickener having a $C_6$–$C_{22}$ hydrophobe and a molecular weight of about 10,000 to about 7,000,000; and
(c) about 1.8 to about 23 lbs/100 gallons of at least one dispersant selected from the group consisting of maleic acid/diisobutylene copolymer, a butylmethacrylate/methacrylic acid copolymer, and an acrylic acid—hydroxypropyl acrylate copolymer;

Mixture 3 is a fluid opacifying pigment mixture comprising:
(a) about 600 to about 1500 lbs/100 gallons of at least one interior-grade titanium dioxide;
(b) about 0.5 to about 3 lbs/100 gallons of at least one hydroxyalkyl cellulose thickener having a molecular weight of about 10,000 to about 10,000,000; and
(c) about 1.8 to about 23 lbs/100 gallons of at least one polyacrylic acid dispersant.

Mixture 4 is a fluid opacifying pigment mixture comprising:
(a) about 600 to about 1500 lbs/100 gallons of at least one universal-grade titanium dioxide;
(b) about 2 to about 6 lbs/100 gallons of at least one hydrophobically-modified hydroxyalkyl cellulose thickener having a molecular weight of about 10,000 to about 10,000,000; and
(c) about 1.8 to about 23 lbs/100 gallons of at least one polyacrylic acid dispersant.

Mixture 5 is a fluid opacifying pigment mixture containing:
(a) about 600 to about 1500 lbs/100 gallons of at least one universal-grade titanium dioxide;
(b) about 0.2 to about 10 lbs/100 gallons of at least one hydrophobically-modified hydroxyalkyl cellulose thickener having a molecular weight of about 10,000 to about 10,000,000;
(c) about 2 to about 10 lbs/100 gallons of at least one hydrophobically-modified ethylene oxide urethane polymer (HEUR) thickener having a $C_4$–$C_{30}$ hydrophobe and a molecular weight of about 10,000 to about 200,000; and
(d) about 3.0 to about 22.5 lbs/100 gallons of at least one maleic acid/diisobutylene copolymer dispersant.

Mixture 6 is a fluid opacifying pigment mixture comprising:
(a) about 600 to about 1500 lbs/100 gallons of at least one universal-grade titanium dioxide;
(b) about 0.2 to about 10 lbs/100 gallons of at least one hydrophobically-modified hydroxyalkyl cellulose thickener having a molecular weight of about 10,000 to about 10,000,000;

(c) about 2 to about 10 lbs/100 gallons of at least one hydrophobically-modified ethylene oxide urethane polymer (HEUR) thickener having a $C_4$–$C_{30}$ hydrophobe and a molecular weight of about 10,000 to about 200,000; and (d) about 0.5 to about 22.5 lbs/100 gallons of at least one acrylic acid—hydroxypropyl acrylate dispersant.

The following mixtures are stable with occasional mixing required.

Mixture 7 is a fluid opacifying pigment mixture comprising:
(a) about 600 to about 1500 lbs/100 gallons of at least one universal-grade titanium dioxide;
(b) about 1 to about 10 lbs/100 gallons of at least one hydroxyalkyl cellulose thickener having a molecular weight of about 10,000 to about 10,000,0000 or hydrophobically-modified hydroxyalkyl cellulose thickener having a molecular weight of about 10,000 to about 10,000,000;
(c) optionally, about 2 to about 12 lbs/100 gallons of at least one hydrophobically-modified ethylene oxide urethane polymer (HEUR) thickener having a $C_4$–$C_{30}$ hydrophobe and a molecular weight of about 10,000 to about 200,000 or at least one clay thickener; and
(d) about 0.5 to about 22.5 lbs/100 gallons of at least one acrylic acid/hydroxyl propyl acrylate dispersant.

Mixture 8 is a fluid opacifying pigment mixture containing:
(a) about 600 to about 1500 lbs/100 gallons of at least one universal-grade titanium dioxide;
(b) about 0.3 to about 5 lbs/100 gallons of at least one hydrophobically-modified, alkali-soluble or alkali-swellable emulsion (HASE) thickener having a $C_6$–$C_{22}$ hydrophobe and a molecular weight of about 10,000 to about 7,000,000; and
(c) about 1.2 to about 45 lbs/100 gallons of at least one polyacrylic acid dispersant.

The following mixtures are stable with constant mixing required. They are formulated as described below.

Mixture 9 is a fluid opacifying pigment mixture containing:
(a) about 600 to about 1500 lbs/100 gallons of at least one universal-grade titanium dioxide;
(b) about 0.5 to about 10 lbs/100 gallons of at least one hydroxyalkyl cellulose thickener having a molecular weight of about 10,000 to about 10,000,0000 or about 0.5 to about 10 lbs/100 gallons of a hydrophobically-modified hydroxyalkyl cellulose thickener having a molecular weight of about 10,000 to about 10,000,000; and
(c) about 1.2 to about 18 lbs/100 gallons of at least one maleic acid/diisobutylene dispersant.

Mixture 10 is a fluid opacifying pigment mixture containing:
(a) about 600 to about 1500 lbs/100 gallons of at least one universal-grade titanium dioxide;
(b) about 0.1 to about 3 lbs/100 gallons of at least one hydrophobically-modified, alkali-soluble or alkali-swellable emulsion (HASE) thickener having a $C_6$–$C_{22}$ hydrophobe and a molecular weight of about 10,000 to about 7,000,000; and
(c) about 0.6 to about 22.5 lbs/100 gallons of at least one acrylic acid/hydroxyl propyl acrylate dispersant.

Mixture 11 is a fluid opacifying pigment mixture containing:
(a) about 600 to about 1500 lbs/100 gallons of at least one universal-grade titanium dioxide;
(b) about 0.1 to about 3 lbs/100 gallons of at least one hydrophobically-modified, alkali-soluble or alkali-swellable emulsion (HASE) thickener having a $C_6$–$C_{22}$ hydrophobe and a molecular weight of about 10,000 to about 7,000,000; and
(c) about 0.6 to about 45 lbs/100 gallons of at least one maleic acid/diisobutylene dispersant.

Mixture 12 is a fluid opacifying pigment mixture containing:
(a) about 600 to about 1500 lbs/100 gallons of at least one interior-grade titanium dioxide;
(b) about 0.2 to about 20 lbs/100 gallons of at least one hydrophobically-modified ethylene oxide urethane polymer (HEUR) thickener selected from the group consisting of:
  (i) a HEUR having a $C_4$–$C_{12}$ hydrophobe and a molecular weight of about 10,000 to about 200,000;
  (ii) a HEUR having a $C_6$–$C_{30}$ hydrophobe and a molecular weight of about 10,000 to about 200,000; and
  (iii) combinations thereof; and
(c) about 1.2 to about 8 lbs/100 gallons of at least one maleic acid/diisobutylene dispersant.

All of the above mixtures have a titanium dioxide ($TiO_2$) pigment volume concentration (PVC) of about 40 to 100%, a titanium dioxide ($TiO_2$) volume solids content of at least about 15%, and a Stormer viscosity of about 50 to about 250 KU.

All of the mixtures contain water and may contain optional additives selected from the group consisting of a defoamer, a surfactant, a coalescent, a base, a biocide, a mildeweide, a co-dispersant, a polymeric binder, a voided latex polymer and combinations thereof.

In order to prepare stable mixtures of opacifying pigments, one must follow strict rules in selecting the types and level of specific ingredients, using the general approach set out below:

select the type and level of titanium dioxide based on whether the final paint will be for exterior or interior use with a universal-grade being selected for interior, exterior, or interior/exterior use and with an interior-grade being selected for interior use only;

select the appropriate rheology modifier/thickener based on the type of titanium dioxide selected;

select the appropriate dispersant based on the type of rheology modifier/thickener selected;

determine the level of dispersant necessary to produce a stable final mixture; and determine the level of rheology modifier/thickener required to produce a stable final mixture.

As used herein, the term "stable" applies to those mixtures that meet all of the following criteria, as set out in the Stability Tests described below, after being stored at a temperature of at least 120° C. for at least ten (10) days:

(1) there is less than 2% by volume of syneresis in the mixture (determined by inspecting the pigment mixture visually) (referred to herein as "Stability Test 1").

(2) the mixture has a Brookfield viscosity (measured at a shear rate of 1.25 $sec^{-1}$) of less than 100,000 centipoise, preferably less than 50,000 centipoise after cooling to ambient temperature (22–25° C.), but prior to mechanical shearing (referred to herein as "Stability Test 2").

(3) the ratio of the Brookfield viscosity (measured at a shear rate of 1.25 $sec^{-1}$) after heat aging to the Brookfield viscosity (measured at a shear rate of 1.25 $sec^{-1}$) prior to heat aging is no greater than 3 after the mixture is cooled to ambient temperature (22–25° C.) and after mechanical shearing using a propeller-type mixer (referred to herein as "Stability Test 3"). Commercial titanium dioxide slurries do not pass Stability Test 1 and must be stirred, sometimes constantly, prior to use. Mixtures having Brookfield viscosities higher than those specified in Stability Test 2 tend to gel and resist flow and therefore are difficult to pump in conventional equipment. Stability Test 3 is used to determine whether or not the mixture developed, or will develop, a gel network resistant to shear thinning (mixing) during storage.

The mixing conditions used to categorize the stability of the fluid opacifying pigment mixtures are as follows:
(1) mixtures which require no mixing or other form of agitation over typical storage times (at least 30 days) and under storage conditions where the temperature can be as high as 140° F. and as low as 25° F. to remain stable are referred to herein as "stable with no mixing required") (require mixing over 0% of storage time);
(2) mixtures which require periodic or occasional mixing or other forms of agitation to re-homogenize or break any minimal or slight structure formed over the typical storage times and conditions described above are referred to herein as "stable with occasional mixing required") (require mixing over >0% of storage time); and
(3) mixtures which require constant mixing or other forms of agitation to re-homogenize or break any significant structure formed over the typical storage times and conditions described above (are referred to herein as "stable with constant mixing required")(require mixing over >50% of storage time).

It should be noted that while the "stable with no mixing required" condition requires no mixing or other form of agitation to remain stable, applying some form of mixing or agitation to the mixture (whether occasional or constant) does not exclude that particular mixture from the definition of a stable mixture with "no mixing required". Likewise, it should be noted that while the "stable with occasional mixing required" condition requires only occasional mixing or other form of agitation to remain stable, applying constant mixing or agitation to the mixture does not exclude that particular mixture from the definition of a stable mixture with "occasional mixing required".

Any type of mixer or agitator may be used such as, but not limited to an impellar, a recirculator, a shaker, a mill, a rotator, a bubbler, a sonicator, a pump or a like means suitable to move the mixture about itself.

The mixtures herein may be employed as prepaints in systems using delayed product differentiation as described in U.S. patent applications Ser. No. 60/183,655 filed Feb. 18, 2000; Ser. No. 60/183,656 filed Feb. 18, 2000; Ser. No. 60/247,639 filed Nov. 10, 2000], as well as employed as replacements for conventional mixtures containing opacifying pigments, such as titanium dioxide slurries, mill bases, colorant dispersions, coating colors, and the like.

The pigment volume concentration (PVC) is a measure of how "binder-rich" a formulation is. It is calculated using the formula:

$$PVC(\%) = \frac{(\text{volume of pigment(s)} + \text{volume extender(s)})}{(\text{volume of pigment(s)} + \text{volume extender(s)} + \text{volume binder(s)})} \times 100$$

The volume solids content (VS) is the dry volume of pigment(s) plus the dry volume of extender(s) plus the dry volume of binder(s). It is calculated using the formula:

$$VS(\%) = \frac{\text{dry volume of pigment(s)} + \text{dry volume of extender(s)} + \text{dry volume of binder(s)}}{\text{total volume of formulation}} \times 100.$$

If additives are present, their volumes are not included in determining the total dry volume.

The titanium dioxide pigment volume concentration (TiO$_2$ PVC) is a measure of how "binder-rich" a formulation is relative to only the titanium dioxide (TiO$_2$) content. It is calculated using the formula:

$$TiO_2 PVC(\%) = \frac{\text{volume of TiO}_2 \text{ pigment(s)}}{(\text{volume of pigment(s)} + \text{volume extender(s)} + \text{volume binder(s)})} \times 100$$

The titanium dioxide volume solids content (TiO$_2$ VS) is the dry volume of TiO$_2$ pigment(s) plus the dry volume of extender(s). It is calculated using the formula:

$$TiO_2 VS(\%) = \frac{\text{dry volume of TiO}_2 \text{ pigment(s)}}{\text{total volume of formulation}} \times 100.$$

If additives are present, their volume is not included in determining the total dry volume.

Opacifying Pigments

Suitable opacifying pigments include:
(1) white pigments which impart white scattering power to a paint across all visible wave lengths without a high degree of absorption; and
(2) auxiliary hiding pigments including inorganic and organic solids or voided latex polymers which do not impart a primary color or hiding power to a paint although they may have secondary influences on those properties.

Such opacifying pigments include titanium dioxide or a combination of titanium dioxide and auxiliary hiding pigments such as voided latex polymer particles, zinc oxide, lead oxide, a synthetic polymer pigment, and mixtures thereof. Rutile and anatase grades of titanium dioxide are suitable for use herein. Rutile titanium dioxide is preferred. The surface of the titanium dioxide may be treated with various organic or inorganic surface treatments, e.g., the oxides of silica, alumina, and zirconia. Fumed titanium oxide is also useful herein.

For specific mixtures, certain grades of titanium dioxide are required. For example, for some of the mixtures universal-grade titanium dioxide may be used, whereas for others interior-grade titanium dioxide must be used. As used herein, "universal-grade" titanium dioxide means titanium dioxide that is suitable for use in both interior and exterior applications and which is typically treated with oxides of alumina (about 1 to about 7%), silica (up to about 15%) and zirconia (up to about 15%). As used herein, "interior-grade" titanium dioxide means titanium dioxide that is only suitable for use in interior applications which is typically treated with only the oxides of alumina (about 1 to about 7%) or a combinations of the oxides of alumina (about 1 to about 7%) with the oxides of silica (up to about 5%). This grade of titanium dioxide is likely to provide poorer water resistance in final coatings than the universal-grade titanium dioxide).

The voided latex particles useful herein have a particle size diameter of about 100 nm to about 2,500 nm and a void fraction of about 10% to about 75%. Preferably, the particles have a particle size of about 500 run to about 1,100 nm. The particles must have at least one void, but they may have multiple voids, non-spherical voids, interconnected voids, voids having channels connected to the outside of the particles, and they can encompass structures described as vesiculated and sponge-like. Preferably, the particles have a single void. They have a glass transition temperature (Tg), as measured by differential scanning calorimetry at a rate of 20° C./minute, of at least about 20° C., preferably at least about 50° C. The higher the Tg, the harder the particle is and the less likely it is to collapse. If the particles collapse, they are unable to contribute to hiding. The voided latex particles may be prepared by conventional polymerization processes known in the art, such as those disclosed in U.S. Pat. Nos. 3,784,391, 4,427,836; 4,469,825; 4,594,363; 4,798,691; 4,880,842; 4,908,271; 4,972,000; 5,041,464, 5,157,084; 5,216,044, 5,494,971; 5,545,695; and 6,020,435, as well as Japanese Patent Applications 60/223,873, 61/62510, 61/66710, 61/86941, 62/127336, 62/156387, 01/185311, and 02/140272.

Thickener

Suitable thickeners include both non-associative, water-soluble/water-swellable thickeners and associative thickeners. Suitable non-associative, water-soluble/water-swellable thickeners include polyvinyl alcohol (PVA), alkali soluble or alkali swellable emulsions known in the art as ASE emulsions, and cellulosic thickeners such as hydroxyalkyl celluloses including hydroxymethyl cellulose, hydroxyethyl cellulose and 2-hydroxypropyl cellulose, sodium carboxymethyl cellulose (SCMC), sodium carboxymethyl cellulose, 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and the like. Suitable associative thickeners include hydrophobically-modified, alkali-soluble emulsions known in the art as HASE emulsions, hydrophobically-modified ethylene oxide-urethane polymers known in the art as HEUR thickeners, hydrophobically-modified cellulosics such as hydrophobically-modified hydroxyethyl cellulose, hydrophobically-modified polyacrylamides, and the like. Also useful as thickeners are fumed silica, attapulgite clay and other types of clay, titanate chelating agents, and the like.

Suitable dispersants include anionic polymers such as homopolymers and copolymers based on polycarboxylic acids, including those that have been hydrophobically- or hydrophilically-modified, e.g., polyacrylic acid, polymethacrylic acid, maleic anhydride and copolymers thereof with each other and with various monomers such as styrene, acrylate or methacrylate, diisobutylene, and other hydrophilic or hydrophobic comonomers. Suitable dispersants further include salts of the above dispersants and mixtures thereof.

The opacifying mixtures may include certain optional additives including defoamers, surfactants, coalescents, biocides, mildewcides, co-dispersants, dispersing resins, latex adsorbing resins, polymeric binders, and the voided latex polymers (described above).

Suitable defoamers include silicone-based and mineral oil-based defoamers and the like.

Suitable surfactants include cationic, anionic and non-ionic surfactants.

Suitable coalescents, plasticizers, and other optional solvents include ethylene glycol, propylene glycol, hexylene glycol, 2,2,4-trimethyl-1,3-pentanediol monoisobutyrate (TEXANOL™), glycol ethers, mineral spirits, methyl carbitol, butyl carbitol, phthalates, adipates, and the like.

Suitable mildewcides and biocides include zinc oxide, isothiazolones, triazoles, and the like.

Suitable co-dispersants include non-ionic, anionic, and cationic dispersants such as 2-amino 2-methyl 1-propanol, dimethyl amino ethanol, potassium tripolyphosphate, trisodium polyphosphate, citric acid and other carboxylic acids, and the like.

Latex polymer binders are polymers or prepolymers which form the primary film of a paint. They bind the pigment and/or extenders, provide the required paint flow, and determine the gloss and hardness of the final paint film. The binder selected will depend upon the final use of the formulated paints. Binders suitable for exterior paints are generally suitable for interior paints, but binders suitable for interior paints may not be suitable for exterior paints. Suitable binders include, but are not limited to, homopolymers, copolymers, or terpolymers such as, for example, polyvinyl acetate, styrene-acrylic, styrene-butadiene, vinyl acetate-acrylic, ethylene-vinyl acetate, vinyl acetate-vinyl versatate, vinyl acetate-vinyl maleate, vinyl acetate-vinyl chloride-acrylic, ethylene-vinyl acetate-acrylic, and urethane polymers, optionally containing up to 10% by weight of functional groups (for example, but not limited to, carboxylic acid, phosphate, sulfate, sulfonate, amide and combinations thereof), other non-functional monomers, and mixtures thereof.

DETAILED DESCRIPTION OF THE INVENTION

All ranges disclosed herein are inclusive and the minimums and maximums of the nested ranges are combinable. All levels are in dry pounds/100 gallons i.e., pounds of solids/100 gallons of the mixtures unless otherwise noted. After the required ingredients and optional ingredients are combined, sufficient water is added to give a total of 100 gallons of the mixture.

The following optional ingredients may be included in any of the combination ranges shown below:

Optional Ingredients

| Ingredient | Types | Preferred Types | Level | Preferred Level |
|---|---|---|---|---|
| Defoamer | any | solvent-based, silicone-based | 1–5 | 2–3 |
| Surfactant | nonionic, anionic, cationic | nonionic, anionic | 1–7 | 1–5 |
| Solvent and coalescent | propylene glycol, ethylene glycol, hexylene glycol, 2,2,4-trimethyl-1-3-pentanediol monoisobutyrate (Texanol ®), butyl carbitol, methyl carbitol, mineral spirits, | propylene glycol, Texanol ® | 1–200 | 1–100 |
| Base | ammonium hydroxide, sodium hydroxide, potassium hydroxide, 2-amino 2-methyl 1-propanol (AMP) | ammonium hydroxide, AMP-95 | up to 10 | up to 5 |
| Biocide | isothiazolones, carbamates, thiazoles, phthalonitriles, dioxanes, hydantoins, carbanilides, triazines, ureas, thiocyanates | iso-thiazolones | up to 5 | up to 3 |
| Mildewcide | isothiazolones, carbamates, thiazoles, phthalonitriles, dioxanes, hydantoins, carbanilides, triazines, ureas, thiocyanates | iso-thiazolones | up to 20 | up to 10 |

-continued

Optional Ingredients

| Ingredient | Types | Preferred Types | Level | Preferred Level |
|---|---|---|---|---|
| Co-dispersant | 2-amino 2-methyl 1-propanol (AMP-95), dimethyl amino ethanol (DMEA), potassium tripolyphosphate (KTTP), trisodium polyphosphate (TSPP), | citric acid, KTTP, AMP | up to 5 | up to 2 |
| Polymeric Binder | See above description | vinyl acrylic, vinyl acetate, styrene acrylic | up to 150 | up to 80 |
| Voided latex polymer | See above description | x | up to 100 | up to 60 |

Combination No. 1

The combinations shown below do not require mixing to remain stable. They are exemplified in Example 1.

| Ingredients | Types | Preferred Types | Level | Preferred Level |
|---|---|---|---|---|
| Dispersant | MA/DIB, BMA/MAA, AA/HPA, SMA | MA/DIB | 1.5–16 | 3.7–14 |
| Thickener | HEUR effective hydrophobe $C_4$–$C_{12}$ MW 10,000–200,000 | HEUR effective hydrophobe $C_4$–$C_{12}$ and MW 12,000–150,000 | 0.2–20 | 10–16 |
|  | HEUR effective hydrophobe $C_6$–$C_{30}$ MW 10,000–200,000, or combinations thereof | HEUR effective hydrophobe $C_6$–$C_{24}$ and MW 12,000–150,000 | 0.8–5 | 0.2–2 |
| TiO$_2$ | Universal grade coated with 1%–7% $Al_2O_3$, up to 15% $SiO_2$, up to 15% $ZrO_2$ | Universal TiO$_2$ coated with 1.5–5% $Al_2O_3$ 1.2–12% $SiO_2$, up to 4% $ZrO_2$ | 600–1500 | 700–1400 |

Combination No. 2

The following combinations do not require mixing to remain stable. They are exemplified in Example 2.

| Ingredients | Types | Preferred Types | Level | Preferred Level |
|---|---|---|---|---|
| Dispersant | MA/DIB, BMA/MAA, AA/HPA, PAA | PAA | 1.8–23 | 3.5–16.8 |
| Thickener | HASE effective hydrophobe $C_6$–$C_{22}$ MW 10,000–7,000,000 | HASE effective hydrophobe $C_6$–$C_{18}$ and MW 100,000–5,000,000 | 0.3–5 | 1–3 |
| TiO$_2$ | Interior grade coated with 1–7% $Al_2O_3$/ 0–5% $SiO_2$ | Interior grade coated with 2–5% $Al_2O_3$/ 0–3% $SiO_2$ | 600–1500 | 700–1400 |

Combination No. 3

The following combinations do not require mixing to remain stable. They are exemplified in Example 3.

| Ingredients | Types | Preferred Types | Level | Preferred Level |
|---|---|---|---|---|
| Dispersant | PAA | PAA | 1.8–23 | 3.5–16.8 |
| Thickener | Hydroxyalkylcellulose and combinations thereof MW 10,000–10,000,000 | Hydroxyethyl cellulose MW 100,000–2,000,000 | 0.5–3 | 1–2 |
| TiO$_2$ | Interior grade coated with 1–7% $Al_2O_3$/ up to 5% $SiO_2$ | Interior grade coated with 2–5% $Al_2O_3$/ up to 3% $SiO_2$ | 600–1500 | 700–1400 |

Combination No. 4

The following combinations do not require mixing to remain stable. They are exemplified in Example 4.

| Ingredients | Types | Preferred Types | Level | Preferred Level |
|---|---|---|---|---|
| Dispersant | PAA | PAA | 1.8–23 | 3.5–16.8 |
| Thickener | Hydrophobically-modified hydroxyalkyllcellulose MW 10,000–10,000,000 | Hydrophobically-modified hydroxyethylcellulose MW 50,000–2,000,000 | 2–6 | 3–5 |
| TiO$_2$ | Universal coated with 1–7% $Al_2O_3$, up to 15% $SiO_2$, up to 15% $ZrO_2$ | Universal coated with 1.5–5% $Al_2O_3$, 1.2–12% $SiO_2$, up to 4% $ZrO_2$ | 600–1500 | 700–1400 |

Combination No. 5

The following combinations do not require mixing to remain stable. They are exemplified in Example 5.

| Ingredients | Types | Preferred Types | Level | Preferred Level |
|---|---|---|---|---|
| Dispersant | MA/DIB or AA/HPA | MA/DIB or AA/HPA | 3.0–22.5 MA/DIB 0.5–22.5 AA/HPA | 5.6–16.8 MA/DIB 2.8–14 AA/HPA |
| Thickener | Hydrophobically-modified hydroxyalkyl cellulose MW 10,000–10,000,000 | Hydrophobically-modified hydroxyethyl cellulose MW 50,000–2,000,000 | 0.2–10 | 0.5–5 |
| Thickener | HEUR effective hydrophobe $C_4$–$C_{30}$ MW 10,000–200,000 | HEUR effective hydrophobe $C_6$–$C_{24}$ MW 12,000–150,000 | 2–10 | 5–10 |
| TiO$_2$ | Universal coated with 1–7% $Al_2O_3$, up to 15% $SiO_2$, up to 15% $ZrO_2$ | Universal coated with 1.5–5% $Al_2O_3$, 1.2–12% $SiO_2$, up to 4% $ZrO_2$ | 600–1500 | 700–1400 |

Combination No. 6

The following combinations requires occasional mixing to remain stable. They are exemplified in Example 6.

| Ingredients | Types | Preferred Types | Level | Preferred Level |
|---|---|---|---|---|
| Dispersant | AA/HPA | AA/HPA | 0.5–22.5 | 2.8–14 |
| Thickener | Hydrophobically-modified hydroxyalkyl cellulose MW 10,000–1,000,000 or Hydroxyethyl cellulose MW 10,000–1,000,000 or combinations of the above | Hydrophobically-modified hydroxyethyl cellulose MW 50,000–1,000,000 | 1–10 | 2–7 |
|  |  | Hydroxyethyl cellulose MW 100,000–1,000,000 | 1–10 | 2–7 |
|  | or combinations of the above with: | | 2–12 | 4–10 |
|  | HEUR effective hydrophobe $C_4$–$C_{30}$ MW 10,000–200,000 or attapulgite clay | HEUR effective hydrophobe $C_6$–$C_{24}$ MW 12,000–150,000 | 2–12 | 3–6 |
| $TiO_2$ | Universal coated with 1.0–7% $Al_2O_3$, up to 15% $SiO_2$, up to 15% $ZrO_2$ | Universal coated with 1.5–5% $Al_2O_3$, 1.2–12% $SiO_2$, up to 4% $ZrO_2$ | 600–1500 | 700–1400 |

Combination No. 7

The following combinations requires occasional mixing to remain stable. They are exemplified in Example 7.

| Ingredients | Types | Preferred Types | Level | Preferred Level |
|---|---|---|---|---|
| Dispersant | PAA | PAA | 1.2–45 | 3.5–28 |
| Thickener | HASE effective hydrophobe $C_6$–$C_{22}$ MW 10,000–7,000,000 | HASE effective hydrophobe $C_6$–$C_{18}$ MW 100,000–5,000,000 | 0.3–5 | 1.0–3 |
| $TiO_2$ | Universal coated with 1–7% $Al_2O_3$, up to 15% $SiO_2$, up to 15% $ZrO_2$ | Universal coated with 1.5–5% $Al_2O_3$, 1.2–12% $SiO_2$, up to 4% $ZrO_2$ | 600–1500 | 700–1400 |

Combination No. 8

The following combinations requires constant mixing to remain stable. They are exemplified in Example 8.

| Ingredients | Types | Preferred Types | Level | Preferred Level |
|---|---|---|---|---|
| Dispersant | MA-DIB | MA-DIB | 1.2–18 | 3.5–14 |
| Thickener | Hydrophobically-modified hydroxyalkyl cellulose MW 10,000–1,000,000 or Hydroxyethyl cellulose MW 10,000–1,000,000 or combinations of the above | Hydrophobically-modified hydroxyethyl cellulose MW 50,000–1,000,000 or Hydroxyethyl cellulose MW 100,000–1,000,000 | 0.5–10 | 0.5–8 |
| $TiO_2$ | Universal coated with 1–7% $Al_2O_3$, up to 15% $SiO_2$, up to 15% $ZrO_2$ | Universal coated with 1.5–5% $Al_2O_3$, 1.2–12% $SiO_2$, up to 4% $ZrO_2$ | 600–1500 | 700–1400 |

Combination No. 9

The following combinations requires constant mixing to remain stable.

| Ingredients | Types | Preferred Types | Level | Preferred Level |
|---|---|---|---|---|
| Dispersant | AA/HPA | AA/HPA | 0.6–22.5 | 2.8–14 |
| Thickener | HASE effective hydrophobe $C_6$–$C_{22}$ MW 10,000–7,000,000 | HASE effective hydrophobe $C_6$–$C_{18}$ MW 100,000–5,000,000 | 0.1–3 | 0.3–2 |
| $TiO_2$ | Universal coated with 1–7% $Al_2O_3$, up to 15% $SiO_2$, up to 15% $ZrO_2$ | Universal coated with 1.5–5% $Al_2O_3$, 1.2–12% $SiO_2$, up to 4% $ZrO_2$ | 600–1500 | 700–1400 |

Combination No. 10

The following combinations will require constant mixing to remain stable.

| Ingredients | Types | Preferred Types | Level | Preferred Level |
|---|---|---|---|---|
| Dispersant | MA/DIB | MA/DIB | 0.6–45 | 2.8–21 |
| Thickener | HASE effective hydrophobe $C_6$–$C_{22}$ MW 10,000–7,000,000 | HASE effective hydrophobe $C_6$–$C_{18}$ MW 100,000–5,000,000 | 0.1–3 | 0.3–2 |
| $TiO_2$ | Universal coated with 1–7% $Al_2O_3$, up to 15% $SiO_2$, up to 15% $ZrO_2$ | Universal coated with 1.5–5% $Al_2O_3$, 1.2–12% $SiO_2$, up to 4% $ZrO_2$ | 600–1500 | 700–1400 |

Combination No. 11

The following combinations require constant mixing to remain stable.

| Ingredients | Types | Preferred Types | Level | Preferred Level |
|---|---|---|---|---|
| Dispersant | MA/DIB | MA/DIB | 1.2–18 | 3.5–14 |
| Thickener | HEUR effective hydrophobe $C_4$–$C_{12}$ MW 10,000–200,000 or | HEUR effective hydrophobe $C_4$–$C_{12}$ MW 12,000–150,000 | 0.2–20 | 10–16 |
|  | HEUR effective hydrophobe $C_6$–$C_{30}$ average MW 10,000–200,000 or combinations thereof | HEUR effective hydrophobe $C_6$–$C_{24}$ MW 12,000–150,000 | 0.8–5 | 0.2–2 |
| $TiO_2$ | Interior grade coated with 1–7% $Al_2O_3$, up to 5% $SiO_2$ | Interior grade coated with 2–5% $Al_2O_3$, up to 3% $SiO_2$ | 600–1500 | 700–1400 |

Test Procedures

The Stormer viscosity of the mixtures is measured using ASTM method D562.

The Brookfield viscosity of the mixtures is measured using spindle #4 of a Brookfield viscometer at 6 rpm.

The ICI viscosity of the mixtures is measured using ASTM method D3205-77.

In the following examples, the mixtures may be prepared using a laboratory mixer having a 45° pitch stirring blade. The water and optional dispersant, defoamer, surfactant and/or biocide are combined and mixed. The titanium dioxide slurry is slowly added and the mixture is stirred for 15–20 minutes. The binder and optional coalescent, rheology modifier, ammonia, and additional water, if necessary, are then added.

In the above description and in the examples, the following abbreviations are used:

| Abbreviations | |
|---|---|
| AA | Acrylic acid |
| PAA | Polyacrylic acid |
| MA/DIB | Maleic acid/diisobutylene copolymer |
| AA/HPA | Acrylic acid/hydroxypropyl acid |
| BMA/MAA | Butylmethacrylate/methacrylic acid copolymer |
| SMA | Styrene or alpha methylstyrene/alkylacrylate (optional)/methacrylic or acrylic acid copolymers or terpolymers |
| HEC | Hydroxyethyl cellulose |
| HMHEC | Hydrophobically-modified HEC |
| HEUR | Hydrophobically-modified ethylene oxide-based urethane block copolymers |
| HASE | Hydrophically-modified alkali soluble emulsions |
| $TiO_2$ | Titanium dioxide |
| $Al_2O_3$ | Alumina or oxide of aluminum |
| $SiO_2$ | Silica or oxide of silicon |
| $ZrO_2$ | Zirconium dioxide |
| cps | centipoises |
| MW | molecular weight as measured by gel permeation chromatography |

EXAMPLES

Example 1

Mixtures A to E described below will require no mixing to remain stable.

| Ingredients | A lbs/100 gallons |
|---|---|
| Grind prepared on Cowles disperser | |
| Water | 258.35 |
| Propylene glycol | 50 |
| Tamol ™ 731 MA/DIB dispersant | 53.42 |
| Foamaster ® VL defoamer | 1.50 |
| Triton CF-10 surfactant | 2.00 |
| Kathon ® LX 1.5% biocide | 2.00 |
| Ti-Pure ® R706 universal-grade $TiO_2$ | 1335.56 |
| Letdown prepared on Cowles disperser | |
| Ammonia hydroxide (28%) | 0.6 |
| Foamaster ® VL defoamer | 1.50 |
| Acrysol ® RM-2020NPR HEUR thickener | 30.00 |
| Letdown (on low speed mixer) | |
| Acrysol ® RM-2020NPR HEUR thickener | 40.40 |
| Water | 68.96 |
| KU initially after preparation | 90 |
| pH initially after preparation | 9.20 |
| ICI initially after preparation | 2.8 |
| Brookfield viscosity (cps at 1.25 $\sec^{-1}$) | 2500 |
| Actual scale prepared (gallons) | 50 |

| Ingredients | B lbs/100 gallons | C lbs/100 gallons | D lbs/100 gallons | E lbs/100 gallons |
|---|---|---|---|---|
| Grind prepared on Cowles disperser | | | | |
| Water | 130 | 130 | 130 | 130 |
| Propylene glycol | 50 | 50 | 50 | 50 |
| Tamol ® 731 MA/DIB dispersant | 29.38 | 29.38 | 29.38 | 29.38 |
| Foamaster ® VL defoamer | 3.00 | 3.00 | 3.00 | 3.00 |
| Triton CF-10 surfactant | 2.00 | 2.00 | 2.00 | 2.00 |
| Kathon ® LX 1.5% biocide | 2.00 | 2.00 | 2.00 | 2.00 |
| Ti-Pure ® R-706 universal-grade $TiO_2$ | 734.56 | 734.56 | 734.56 | 734.56 |
| Rhoplex ® SG-10M acrylic binder | 151.20 | 151.20 | 151.20 | 151.20 |
| Texanol ® coalescent | 12.5 | 12.5 | 12.5 | 12.5 |
| Ammonium hydroxide (28%) | 0.60 | 0.60 | 0.60 | 0.60 |
| Ropaque ® Ultra opaque polymer | 164.44 | 164.44 | 164.44 | 164.44 |

-continued

| | | | | |
|---|---|---|---|---|
| Acrysol ® RM-2020NPR HEUR thickener (Letdown prepared on low speed mixer) | 30 | 30 | 30 | 30 |
| Co-thickener type | Acrysol ® RM-2020NPR HEUR | Acrysol ® RM-825 HEUR | Acrysol ® SCT-275 HEUR | Acrysol ® RM-12W HEUR |
| Level of co-thickener | 33.5 | 2.24 | 2.63 | 4.84 |
| water | 60.0 | 91.2 | 90.8 | 88.5 |
| KU initially after preparation | 93 | 99 | 96 | 96 |
| pH initially after preparation | 8.80 | 8.78 | 8.76 | 8.74 |
| ICI initially after preparation | 3.0 | 1.7 | 1.8 | 1 7 |
| Brookfield viscosity (cps at 1.25 sec$^{-1}$) | 3010 | 3710 | 6010 | 24000 |
| Actual scale prepared (gallons) | 50 | 50 | 50 | 50 |

Example 2

Mixtures A to G described below will require no mixing to remain stable.

| Ingredients | A lbs/100 gallons | B lbs/100 gallons | C lbs/100 gallons | D lbs/100 gallons |
|---|---|---|---|---|
| Grind prepared on Cowles disperser | | | | |
| Water | 228.00 | 228.00 | 228.00 | 228.00 |
| Propylene glycol | 50.00 | 50.00 | 50.00 | 50.00 |
| Tamol ® 1254 AA/MAA dispersant | 38.16 | 38.16 | 38.16 | 38 16 |
| Triton ® CF-10 surfactant | 2.00 | 2.00 | 2.00 | 2.00 |
| Foamaster ® VL defoamer | 1.50 | 1.50 | 1.50 | 1.50 |
| Kathon ® LX 1.5% biocide | 2.00 | 2.00 | 2.00 | 2.00 |
| Ti-Pure ® R900 interior-grade TiO$_2$ | 1335.52 | 1335.52 | 1335.52 | 1335.52 |
| Letdown prepared on Cowles disperser | | | | |
| Foamaster ® VL defoamer | 1.50 | 1.50 | 1.50 | 1.50 |
| Water | 97.00 | 97.00 | 97.00 | 97.00 |
| Ammonium hydroxide (28%) | 0.4 | 0.4 | 0.4 | 0.4 |
| Acrysol ® DR-1 HASE thickener | 1.0 | 1.0 | 1.0 | 1.0 |
| Letdown prepared on low speed mixer | | | | |
| Acrysol ® DR-1 HASE thickener | 4.0 | 5.0 | 6.0 | 7.0 |
| Water | 83.96 | 82.96 | 81.96 | 80.96 |
| KU initially after preparation | 77 | 80 | 83 | 87 |
| pH initially after preparation | 0.4 | 0.5 | 0.6 | 0.6 |
| ICI initially after preparation | 9.06 | 8.98 | 8.89 | 8.79 |
| Brookfield viscosity (cps at 1.25 sec$^{-1}$) | 12800 | 14500 | 15000 | 16700 |
| Actual scale prepared (gallons) | 50 | 50 | 50 | 50 |

-continued

| | E lbs/100 gallons | F lbs/100 gallons | G lbs/100 gallons |
|---|---|---|---|
| Grind prepared on Cowles disperser | | | |
| Water | 228.00 | 228.00 | 228.00 |
| Propylene glycol | 50.00 | 50.00 | 50.00 |
| Tamol ® 1254 AA/MAA dispersant | 38.16 | 38.16 | 38.16 |
| Triton ® CF-10 surfactant | 2.00 | 2.00 | 2.00 |
| Foamaster ® VL defoamer | 1.50 | 1.50 | 1.50 |
| Kathon ® LX 1.5% biocide | 2.00 | 2.00 | 2.00 |
| Ti-Pure ® R900 interior grade TiO$_2$ | 1335.52 | 1335.52 | 1335.52 |
| Letdown prepared on Cowles disperser | | | |
| Foamaster ® VL defoamer | 1.50 | 1.50 | 1.50 |
| Water | 97.00 | 97.00 | 97.00 |
| Letdown prepared on low speed mixer | | | |
| Thickener type | Acrysol ® DR-73 HASE | Acrysol ® DR-1 HASE | Acrysol ® DR-3 HASE |
| Level of thickener | 6.86 | 6.08 | 6.04 |
| Ammonia hydroxide (28%) | 0.40 | 0.30 | 0.22 |
| Water | 82.08 | 82.96 | 83.08 |
| KU initially after preparation | 81 | 81 | 81 |
| pH initially after preparation | 0.8 | 0.6 | 0.7 |
| ICI initially after preparation | 9.01 | 8.96 | 8.99 |
| Brookfield viscosity (cps at 1.25 sec$^{-1}$) | 15700 | 15300 | 15200 |
| Actual scale prepared (gallons) | 50 | 50 | 50 |

Example 3

Mixture A described below will require no mixing to remain stable.

| Ingredients | A lbs/100 gallons |
|---|---|
| Grind prepared on Cowles disperser | |
| Water | 228.00 |
| Propylene glycol | 50.00 |
| Tamol ® 1254 AA/MAA dispersant | 38.16 |
| Triton ® CF-10 surfactant | 2.00 |
| Foamaster ® VL defoamer | 1.50 |
| Kathon ® LX 1.5% biocide | 2.00 |
| Ti-Pure ® R900 interior-grade TiO$_2$ | 1335.52 |
| Letdown prepared of Cowles disperser | |
| Foamaster ® VL defoamer | 1.50 |
| Water | 97.00 |
| Letdown prepared on low speed mixer | |
| Natrosol ® 250 MHR (3.5% solution in water) HEC thickener | 41.16 |
| Water | 48.18 |
| KU initially after preparation | 80 |
| pH initially after preparation | 0.6 |
| ICI initially after preparation | 9.37 |
| Brookfield viscosity (cps at 1.25 sec$^{-1}$) | 15100 |
| Actual scale prepared (gallons) | 50 |

Example 4

Mixture A described below will require no mixing to remain stable.

| Ingredients | A<br>lbs/100 gallons |
|---|---|
| Grind prepared on Cowles disperser | |
| Water | 168.76 |
| Propylene glycol | 62.5 |
| Tamol ® 1254 AA/MAA dispersant | 26.24 |
| Foamaster ® VL defoamer | 1.88 |
| Triton ® CF-10 surfactant | 2.50 |
| Kathon ® LX 1.5% biocide | 2.50 |
| Ti-Pure ® R902 universal-grade TiO$_2$ | 918.2 |
| Letdown prepared on Cowles disperser | |
| Foamaster ® VL defoamer | 1.88 |
| Ropaque ® Ultra opaque polymer | 205.56 |
| Letdown prepared on a low speed mixer | |
| Natrosol ® Plus 430 (4% in solution in water) HMHEC thickener | 89.52 |
| Ammonia hydroxide (28%) | 0.46 |
| Water | 55.46 |
| KU initially after preparation | 97 |
| pH initially after preparation | 8.77 |
| ICI initially after preparation | 1.0 |
| Brookfield viscosity (cps at 1.25 sec$^{-1}$) | 18000 |
| Actual scale prepared (gallons) | 50 |

Example 5

Mixtures A to C described below will require no mixing to remain stable.

| Ingredients | A<br>lbs/100 gallons |
|---|---|
| Grind prepared on Cowles disperser | |
| Water | 160 |
| Propylene glycol | 50 |
| Tamol ® 1124 AA/HPA dispersant | 7.35 |
| Kathon ® LX 1.5% biocide | 2.00 |
| Ti-Pure ® R706 universal-grade TiO$_2$ | 918.2 |
| Letdown prepared on Cowles disperser | |
| Foamaster ® VL defoamer | 1.5 |
| Ropaque ® Ultra opaque polymer | 205.56 |
| Acrysol ® RM-2020NPR HEUR thickener | 40.0 |
| Natrosol ® Plus 330 (3% in solution in water) HMHEC thickener | 68.32 |
| Ammonium hydroxide (28%) | 2.16 |
| Water | 76.3 |
| KU initially after preparation | 98 |
| pH initially after preparation | 8.73 |
| ICI initially after preparation | 1.3 |
| Brookfield viscosity (cps at 1.25 sec$^{-1}$) | 18500 |
| Actual scale prepared (gallons) | 50 |

| Ingredients | B<br>lbs/100 gallons |
|---|---|
| Grind prepared on Cowles disperser | |
| Water | 130 |
| Propylene glycol | 50 |
| Tamol ® 731 MA/DIB dispersant | 29.38 |
| Foamaster ® VL defoamer | 1.50 |
| Triton ® CF-10 surfactant | 2.00 |
| Kathon ® LX 1.5% biocide | 2.00 |
| Ti-Pure ® R706 universal-grade TiO$_2$ | 734.56 |
| Letdown prepared on Cowles disperser | |
| Rhoplex ® SG-10M acrylic binder | 151.20 |
| Texanol ® coalescent | 12.5 |
| Ammonium hydroxide (28%) | 0.60 |
| Ropaque ® Ultra opaque polymer | 164.44 |
| Foamaster ® VL defoamer | 1.50 |
| Acrysol ® RM-2020NPR HEUR thickener | 30.00 |
| Letdown prepared on low speed mixer | |
| Natrosol ® Plus 330 (3% in solution in water) HMHEC thickener | 27.6 |
| Water | 65.82 |
| KU initially after preparation | 98 |
| pH initially after preparation | 8.73 |
| ICI initially after preparation | 1.9 |
| Brookfield viscosity (cps at 1.25 sec$^{-1}$) | 10800 |
| Actual scale prepared (gallons) | 50 |

| Ingredients | C<br>lbs/100 gallons |
|---|---|
| Grind prepared on Cowles disperser | |
| Water | 130 |
| Propylene glycol | 50 |
| Tamol ® 731 MA/DIB dispersant | 30.04 |
| Foamaster ® VL defoamer | 1.50 |
| Triton ® CF-10 surfactant | 2.00 |
| Kathon ® LX 1.5% biocide | 2.00 |
| Kronos ® 2102 universal-grade TiO$_2$ | 751.09 |
| Rhoplex ® SG-10M acrylic binder | 151.2 |
| Texanol ® coalescent | 12.49 |
| Ammonia hydroxide (28%) | 0.60 |
| Ropaque ® Ultra opaque polymer | 164.44 |
| Foamaster ® VL defoamer | 1.50 |
| Acrysol ® RM-2020NPR HEUR thickener | 30.00 |
| Letdown prepared on low speed mixer | |
| Natrosol ® Plus 330 (3% in solution in water) HMHEC thickener | 25.04 |
| Water | 67.76 |
| KU initially after preparation | 99 |
| pH initially after preparation | 1.8 |
| ICI initially after preparation | 9.22 |
| Brookfield viscosity (cps at 1.25 sec$^{-1}$) | 10100 |
| Actual scale repared (gallons) | 50 |

Example 6

Mixtures A to D described below will require occasional mixing to remain stable.

| Ingredients | A<br>lbs/100 gallons | B<br>lbs/100 gal |
|---|---|---|
| Grind prepared on Cowles disperser | | |
| Water | 272.7 | 272.7 |
| Tamol ® 1124 AA/HPA dispersant | 7.35 | 7.35 |
| Kathon ® LX 1.5% biocide | 2.00 | 2.00 |
| Ti-Pure ® R706 universal-grade TiO$_2$ | 918.2 | 918.2 |
| Letdown prepared on low speed mixer | | |
| Triton ® CF-10 surfactant | 0 | 1.0 |
| Propylene glycol | 50 | 50 |

-continued

| | C lbs/100 gallons | D lbs/100 gallons |
|---|---|---|
| Foamaster ® VL defoamer | 1.5 | 1.5 |
| Ropaque ® Ultra opaque polymer | 205.56 | 205.56 |
| Natrosol ® Plus 330 (3% in solution in water) HMHEC thickener | 192 | 113 |
| Attagel ® 50 attagulpite clay (100% solid) | — | 5.0 |
| Ammonia hydroxide (28%) | 1.96 | 1.98 |
| KU initially after preparation | 92 | 94 |
| pH initially after preparation | 0.5 | 0.5 |
| ICI initially after preparation | 8.87 | 8.75 |
| Brookfield viscosity (cps at 1.25 sec⁻¹) | 23000 | 27700 |
| Actual scale prepared (gallons) | 57 | 53 |

| Ingredients | C lbs/100 gallons | D lbs/100 gallons |
|---|---|---|
| Grind prepared on Cowles disperser | | |
| Propylene glycol | 50 | 50 |
| Water | 160 | 160 |
| Tamol ® 1124 AA/HPA dispersant | 7.35 | 7.35 |
| Kathon ® LX 1.5% biocide | 2.00 | 2.00 |
| Ti-Pure ® R706 universal-grade TiO$_2$ | 918.2 | 918.2 |
| Letdown prepared on low speed mixer | | |
| Foamaster ® VL defoamer | 1.5 | 1.5 |
| Ropaque ® Ultra opaque polymer | 205.56 | 205.56 |
| Natrosol ® Plus 330 (3% in solution in water) HMHEC thickener | 80.06 | |
| Natrosol ® 250 MHR (3.5% in solution in water) HEC thickener | | 134.7 |
| Ammonium hydroxide (28%) | 1.80 | 1.86 |
| Water | 106.7 | 50.22 |
| KU initially after preparation | 94 | 98 |
| pH initially after preparation | 8.68 | 8.67 |
| ICI initially after preparation | 0.5 | 0.8 |
| Brookfield viscosity (cps at 1.25 sec⁻¹) | 18700 | 28200 |
| Actual scale prepared (gallons) | 50 | 50 |

Example 7

Mixtures A to E described below will require occasional mixing to remain stable.

| Ingredients | A lbs/100 gallons | B lbs/100 gallons | C lbs/100 gallons | D lbs/100 gallons | E lbs/100 gallons |
|---|---|---|---|---|---|
| Grind prepared on Cowles disperser | | | | | |
| Water | 115 | 115 | 115 | 115 | 93.46 |
| Propylene glycol | 50 | 50 | 50 | 50 | 40.64 |
| Tamol ® 1254 AA/MAA dispersant | 20.99 | 10.49 | 31.48 | 41.97 | 25.59 |
| Foamaster ® VL defoamer | 2.00 | 2.00 | 2.00 | 2.00 | 2.44 |
| Triton ® CF-10 surfactant | 1.50 | 1.50 | 1.50 | 1.50 | 1.63 |
| Kathon ® LX 1.5% biocide | 2.00 | 2.00 | 2.00 | 2.00 | 1.63 |
| Ti-Pure ® R706 universal-grade TiO$_2$ | 734.56 | 734.56 | 734.56 | 734.56 | 596.96 |

-continued

| Ingredients | A lbs/100 gallons | B lbs/100 gallons | C lbs/100 gallons | D lbs/100 gallons | E lbs/100 gallons |
|---|---|---|---|---|---|
| Foamaster ® VL defoamer | 1.50 | 1.50 | 1.50 | 1.50 | |
| Ropaque ® Ultra opaque polymer | 164.44 | 164.44 | 164.44 | 164.44 | 133.64 |
| Letdown prepared on low speed mixer | | | | | |
| Res 3083 emulsion | 140.10 | 140.10 | 140.10 | 140.10 | 245.05 |
| Texanol ® coalescent | 11.37 | 11.37 | 11.37 | 11.37 | 15.73 |
| Acrysol ® DR-3 HASE thickener | 9.6 | 7.12 | 5.67 | 4.12 | 7.92 |
| Ammonium hydroxide (28%) | 2.12 | 2.34 | 1.96 | 1.81 | 2.28 |
| Water | 150.8 | 152.8 | 145.55 | 138.67 | 144.93 |
| KU initially after preparation | 100 | 101 | 99 | 97 | 98 |
| pH initially after preparation | | 8.69 | 8.54 | 8.68 | 8.4 |
| ICI initially after preparation | 0.9 | 0.8 | 0.8 | 0.7 | 1.1 |
| Brookfield viscosity (cps at 1.25 sec⁻¹) | 27700 | 29200 | 31600 | 29900 | 23800 |

Example 8

Mixtures A and B described below will require constant mixing to remain stable.

| Ingredients | A lbs/100 gallons | B lbs/100 gallons |
|---|---|---|
| Grind prepared on Cowles disperser | | |
| Water | 174.98 | 174.98 |
| Propylene glycol | 62.49 | 62.49 |
| Tamol ® 731 MA/DIB dispersant | 36.72 | 36.72 |
| Foamaster ® VL defoamer | 1.87 | 1.87 |
| Triton ® CF-10 surfactant | 2.50 | 2.50 |
| Kathon ® LX 1.5% biocide | 2.50 | 2.50 |
| Ti-Pure ® R706 universal-grade TiO$_2$ | 918.12 | 918.12 |
| Letdown prepared on Cowles disperser | | |
| Foamaster ® VL defoamer | 1.87 | 1.87 |
| Ropaque ® Ultra opaque polymer | 205.53 | 205.53 |
| Letdown on a low speed mixer | | |
| Natrosol ® Plus 330 (3% in solution in water) HMHEC thickener | | 45.09 |
| Natrosol ® 250 MHR (3.5% in solution in water) HEC thickener | 127.69 | 45.09 |
| Ammonium hydroxide (28%) | 1.00 | 1.34 |
| Water | 0 | 80.99 |
| KU initially after preparation | 99 | 99 |
| pH initially after preparation | 8.69 | 8.76 |
| ICI initially after preparation | 1.6 | 0.8 |
| Brookfield viscosity (cps at 1.25 sec⁻¹) | 20200 | 22700 |
| Actual scale prepared (gallons) | 100 | 100 |

| Supplier Information | | |
|---|---|---|
| Material Name | Description | Supplier |
| Tamol ™ 1124 | Dispersant | Rohm and Haas Company (Philadelphia, PA) |
| Tamol ™ 1254 | Dispersant | Rohm and Haas Company (Philadelphia, PA) |
| Tamol ™ 731 | MA/GIB Dispersant | Rohm and Haas Company (Philadelphia, PA) |
| Acrysol ™ DR-1 | HASE Thickener | Rohm and Haas Company (Philadelphia, PA) |
| Acrysol ™ DR-3 | HASE Thickener/Rheology Modifier | Rohm and Haas Company (Philadelphia, PA) |
| Acrysol ™ DR-73 | HASE Thickener | Rohm and Haas Company (Philadelphia, PA) |
| Acrysol ™ RM-2020 NPR | HEUR Thickener/Rheology Modifier | Rohm and Haas Company (Philadelphia, PA) |
| Rhoplex ™ SG-10M | Emulsion Polymer Binder | Rohm and Haas Company (Philadelphia, PA) |
| RES 3083 | Emulsion Polymer Binder | Rohm and Haas Company (Philadelphia, PA) |
| Kathon ™ LX 1.5% | Biocide | Rohm and Haas Company (Philadelphia, PA) |
| Triton ™ CF-10 | Surfactant | Union Carbide Corporation (Danbury, CT) |
| Foamaster ™ VL | Defoamer | Henkel Corporation (King of Prussia, PA) |
| Ti-Pure ™ R-706 | Titanium Dioxide | E. I. Dupont de Nemours and Co., Inc. (Wilmington, DE) |
| Ti-Pure ™ R-900 | Titanium Dioxide | E. I. Dupont de Nemours and Co., Inc. (Wilmington, DE) |
| Ti-Pure ™ R-902 | Titanium Dioxide | E. I. Dupont de Nemours and Co., Inc. (Wilmington, DE) |
| Kronas ® 2102 | Universal Grade Titanium Dioxide | Kronas (Houston, TX) |
| Ropaque ® | Ultra Opaque Synthetic/Polymer | Rohm and Haas (Philadelphia, PA) |
| Texanol ™ | Coalescent | Eastman Chemical (Kings Port, TN) |
| Natrosol ® | HEC Thickner | Hercules (Wilmington, DE) |
| Natrosol ® Plus 430 | HMHEC Thickener | Hercules (Wilmington, DE) |
| Natrosol ® Plus 330 | HMHEC Thickener | Hercules (Wilmington, DE) |
| Natrosol ® 250 MHR | HEC Thickener | Hercules (Wilmington, DE) |
| Attrgel ® 50 | Attapulgite Clay | Engelhardt (Edison, NJ) |

What is claimed is:

1. A fluid opacifying pigment mixture having a titanium dioxide pigment volume concentration of about 40 to about 100%, a titanium dioxide volume solids content of at least about 15%, and a Stormer viscosity of about 50 to about 250 KU, which mixture comprises:
   (a) about 600 to about 1500 lbs/100 gallons of at least one universal-grade titanium dioxide;
   (b) about 0.2 to about 20 lbs/100 gallons of at least one hydrophobically-modified ethylene oxide-urethane polymer (HEUR) thickener selected from the group consisting of:
      (i) a HEUR having a $C_4$–$C_{12}$ hydrophobe and a molecular weight of about 10,000 to about 200,000,
      (ii) a HEUR having a $C_6$–$C_{30}$ hydrophobe and a molecular weight of about 10,000 to about 200,000, and
      (iii) combinations thereof,
   (c) about 1.5 to about 16 lbs/100 gallons of at least one dispersant selected from the group consisting of a maleic acid/diisobutylene copolymer, a butyl methacrylate/methacrylic acid copolymer, and an acrylic acid/hydroxypropyl acrylate copolymer; and
   (d) water.

2. A fluid opacifying pigment mixture having a titanium dioxide pigment volume concentration of about 40 to about 100%, a titanium dioxide volume solids content of at least about 15%, and a Stormer viscosity of to about 50 to about 250 KU, which mixture comprises:
   (a) about 600 to about 1500 lbs/100 gallons of at least one interior-grade titanium dioxide;
   (b) about 0.3 to about 5 lbs/100 gallons of at least one hydrophobically modified, alkali-soluble emulsion (HASE) thickener having a $C_6$–$C_{22}$ hydrophobe and a molecular weight of about 10,000 to about 7,000,000;
   (c) about 1.8 to about 23 lbs/100 gallons of at least one dispersant selected from the group consisting of a maleic acid/diisobutylene copolymer, a butyl methacrylate/methacrylic acid copolymer, an acrylic acid/hydroxypropyl acrylate copolymer and a polyacrylic acid; and
   (d) water.

3. A fluid opacifying pigment mixture having a titanium dioxide pigment volume concentration of about 40 to about 100%, a titanium dioxide volume solids content of at least about 15%, and a Stormer viscosity of about 50 to about 250 KU, which comprises:
   (a) about 600 to about 1500 lbs/100 gallons of at least one universal-grade titanium dioxide;
   (b) about 2 to about 6 lbs/100 gallons of at least one hydrophobically-modified hydroxyalkyl cellulose thickener having a molecular weight of about 10,000 to about 10,000,000;
   (c) about 1.8 to about 23 lbs/100 gallons of at least one polyacrylic acid dispersant; and
   (d) water.

4. A fluid opacifying pigment mixture having a titanium dioxide pigment volume concentration of about 40 to about 100%, a titanium dioxide volume solids content of at least about 15%, and a Stormer viscosity of about 50 to about 250 KU, which mixture comprises:
   (a) about 600 to about 1500 lbs/100 gallons of at least one universal-grade titanium dioxide;
   (b) about 0.2 to about 10 lbs/100 gallons of at least one hydrophobically-modified hydroxyalkyl cellulose thickener having a molecular weight of about 10,000 to about 10,000,000;
   (c) about 2 to about 10 lbs/100 gallons of at least one hydrophobically-modified ethylene oxide-urethane polymer (HEUR) thickener having a $C_4$–$C_{30}$ hydrophobe and a molecular weight of about 10,000 to about 200,000;
   (d) about 3.0 to about 22.5 lbs/100 gallons of at least one maleic acid/diisobutylene copolymer dispersant; and
   (e) water.

5. A fluid opacifying pigment mixture having a titanium dioxide pigment volume concentration of about 40 to about 100%, a titanium dioxide volume solids content of at least about 15%, and a Stormer viscosity of about 50 to about 250 KU, which mixture comprises:
   (a) about 600 to about 1500 lbs/100 gallons of at least one universal-grade titanium dioxide;
   (b) about 0.2 to about 10 lbs/100 gallons of at least one hydrophobically-modified hydroxyalkyl cellulose thickener having a molecular weight of about 10,000 to about 10,000,000;
   (c) about 2 to about 10 lbs/100 gallons of at least one hydrophobically-modified ethylene oxide-urethane polymer (HEUR) thickener having a $C_4$–$C_{30}$ hydrophobe and a molecular weight of about 10,000 to about 200,000, (d) about 0.5 to about 22.5 lbs/100 gallons of at least one acrylic acid/hydroxypropyl acrylate dispersant; and (e) water.

6. A fluid opacifying pigment mixture having a titanium dioxide pigment volume concentration of about 40 to about 100%, a titanium dioxide volume solids content of at least about 15%, and a Stormer viscosity of about 50 to about 250 KU, which mixture comprises:

(a) about 600 to about 1500 lbs/100 gallons of at least one universal-grade titanium dioxide;

(b) about 0.2 to about 10 lbs/100 gallons of at least one hydroxyalkyl cellulose thickener having a molecular weight of about 10,000 to about 10,000,0000 or a hydrophobically-modified hydroxyalkyl cellulose thickener having a molecular weight of about 10,000 to about 10,000,000;

(c) about 0.5 to about 22.5 lbs/100 gallons of at least one acrylic acid/hydroxypropyl acrylate dispersant; and (d) water.

7. A fluid opacifying pigment mixture having a titanium dioxide pigment volume concentration of about 40 to about 100%, a titanium dioxide volume solids content of at least about 15%, and a Stormer viscosity of about 50 to about 250 KU, which mixture comprises:

(a) about 600 to about 1500 lbs/100 gallons of at least one universal-grade titanium dioxide;

(b) about 0.3 to about 5 lbs/100 gallons of at least one hydrophobically-modified, alkali-soluble or alkali-swellable emulsion (HASE) thickener having a $C_6$–$C_{22}$ hydrophobe and molecular weight of about 10,000 to about 7,000,000;

(c) about 1.2 to about 45 lbs/100 gallons of at least one polyacrylic acid dispersant; and (d) water.

8. A fluid opacifying pigment mixture having a titanium dioxide pigment volume concentration of about 40 to about 100%, a titanium dioxide volume solids content of at least about 15%, and a Stormer viscosity of about 50 to about 250 KU, which mixture comprises:

(a) about 600 to about 1500 lbs/100 gallons of at least one universal-grade titanium dioxide;

(b) about 0.5 to about 10 lbs/100 gallons of a hydrophobically-modified hydroxyalkyl cellulose thickener having a molecular weight of about 10,000 to about 10,000,000;

(c) about 1.2 to about 18 lbs/100 gallons of at least one maleic acid/diisobutylene dispersant; and (d) water.

9. A fluid opacifying pigment mixture having a titanium dioxide pigment volume concentration of about 40 to about 100%, a titanium dioxide volume solids content of at least about 15%, and a Stormer viscosity of about 50 to about 250 KU, which mixture comprises:

(a) about 600 to about 1500 lbs/100 gallons of at least one universal-grade titanium dioxide;

(b) about 0.1 to about 3 lbs/100 gallons of at least one hydrophobically-modified, alkali-soluble or alkali-swellable emulsion (HASE) thickener having a $C_6$–$C_{22}$ hydrophobe and a molecular weight of about 10,000 to about 7,000,000;

(c) about 0.6 to about 22.5 lbs/100 gallons of at least one acrylic acid—hydroxypropyl acrylate dispersant; and (d) water.

10. A fluid opacifying pigment mixture having a titanium dioxide pigment volume concentration of about 40 to about 100%, a titanium dioxide volume solids content of at least about 15%, and a Stormer viscosity of about 50 to about 250 KU, which mixture comprises:

(a) about 600 to about 1500 lbs/100 gallons of at least one universal-grade titanium dioxide;

(b) about 0.1 to about 3 lbs/100 gallons of at least one hydrophobically-modified, alkali-soluble or alkali-swellable emulsion (HASE) thickener having a $C_6$–$C_{22}$ hydrophobe and a molecular weight of about 10,000 to about 7,000,000;

(c) about 0.6 to about 45 lbs/100 gallons of at least one maleic acid/diisobutylene copolymer dispersant; and (d) water.

11. A fluid opacifying pigment mixture, a titanium dioxide pigment volume concentration of about 40 to about 100%, a titanium having dioxide volume solids content of at least about 15%, and a Stormer viscosity of about 50 to about 250 KU, which mixture comprises:

(a) about 600 to about 1500 lbs/100 gallons of at least one interior-grade titanium dioxide;

(b) about 0.2 to about 20 lbs/100 gallons of at least one hydrophobically-modified ethylene oxide-urethane polymer (HEUR) thickener selected from the group consisting of a HEUR having a $C_4$–$C_{12}$ hydrophobe and a molecular weight of about 10,000 to about 200,000, a HEUR having a $C_6$–$C_{30}$ hydrophobe and a molecular weight of about 10,000 to about 200,000, and combinations thereof;

(c) about 1.2 to about 18 lbs/100 gallons of at least one maleic acid/diisobutylene dispersant; and (d) water.

12. The mixture of claims 1, 2, 3, 4, 5, 6, 7, 8, 9, 10, or 11, which further comprises one or more additives selected from the group consisting of a defoamer, a surfactant, a coalescent, a base, a biocide, a mildewcide, a co-dispersant, a polymeric binder, and a voided latex polymer.

13. The mixture of claim 6, further comprising about 2 to about 12 lbs/100 gallons of at least one hydrophobically-modified ethylene oxide-urethane polymer (HEUR) thickener having a $C_4$–$C_{30}$ hydrophobe and a molecular weight of about 10,000 to about 200,000 or at least one clay thickener.

14. The mixture of claims 1, 2, 3, 4, 5, 6, 7, 8, 9, 10, or 12, wherein the pigment volume concentration is about 50 to 100%.

15. The mixture of claim 14, wherein the pigment volume concentration is about 60 to about 100%.

16. The mixture of claim 15, wherein the pigment volume concentration is about 70 to about 100%.

17. The mixture of claim 16, wherein the pigment volume concentration is about 80 to about 100%.

18. The mixture of claim 17, wherein the pigment volume concentration is about 90 to about 100%.

19. The mixture of claims 6–11, wherein said mixing is carried out using an impeller, a recirculator, a shaker, a mill, a rotator, a bubbler, a sonicator, a pump or combinatiuons thereof.

* * * * *